(12) United States Patent
Lionel

(10) Patent No.: US 6,901,712 B2
(45) Date of Patent: Jun. 7, 2005

(54) SELF-ADHERING VAPOR PERMEABLE AIR AND MOISTURE BARRIER MEMBRANE

(75) Inventor: Borenstein Lionel, Laval (CA)

(73) Assignee: Bakor Inc., Lachine (CA)

( * ) Notice: Subject to any disclaimer, the term of this patent is extended or adjusted under 35 U.S.C. 154(b) by 32 days.

(21) Appl. No.: 10/402,440

(22) Filed: Mar. 28, 2003

(65) Prior Publication Data

US 2004/0103608 A1 Jun. 3, 2004

(30) Foreign Application Priority Data

Dec. 3, 2002 (CA) .............................. 2413550

(51) Int. Cl.$^7$ .............................. E04B 2/02; C09J 7/02
(52) U.S. Cl. .................... 52/408; 156/71; 52/741.1; 428/40.1; 428/41.8; 428/202; 428/220
(58) Field of Search ................ 52/408, 741.1

(56) References Cited

U.S. PATENT DOCUMENTS

| 3,532,589 | A |   | 4/1965  | David |
|-----------|---|---|---------|-------|
| 3,645,835 | A | * | 2/1972  | Hodgson ................. 428/195.1 |
| 3,776,805 | A | * | 12/1973 | Hansen ...................... 428/35.9 |
| 4,328,652 | A | * | 5/1982  | Naumovich, Jr. ............ 52/408 |
| 4,680,913 | A |   | 7/1987  | Geisen et al. |
| 4,929,303 | A | * | 5/1990  | Sheth .......................... 156/209 |
| 5,091,235 | A |   | 2/1992  | Vergano |
| 5,317,035 | A |   | 5/1994  | Jacoby et al. |
| 5,374,477 | A | * | 12/1994 | Lawless et al. .......... 428/317.3 |
| 5,398,471 | A |   | 3/1995  | Spagnolo |
| 5,410,852 | A | * | 5/1995  | Edgar et al. .................... 52/408 |
| 5,518,799 | A | * | 5/1996  | Finestone et al. ........... 428/137 |
| 5,593,771 | A | * | 1/1997  | Lawless et al. .......... 428/317.3 |
| 5,639,539 | A | * | 6/1997  | DeProspero et al. ...... 428/195.1 |
| 5,953,883 | A | * | 9/1999  | Ojala ......................... 52/794.1 |
| 5,972,147 | A |   | 10/1999 | Janis |
| 5,998,015 | A | * | 12/1999 | Furst .......................... 428/336 |
| 6,083,613 | A | * | 7/2000  | Hayashi et al. ........... 428/315.7 |
| 6,279,284 | B1 | * | 8/2001 | Moras .......................... 52/408 |
| 6,410,118 | B1 | * | 6/2002 | Reicherts et al. ............ 428/141 |
| 6,673,432 | B2 | * | 1/2004 | Kiik et al. ................ 428/301.1 |
| 6,706,225 | B2 | * | 3/2004 | Cabrey ........................ 264/112 |
| 2002/0173211 | A1 | * | 11/2002 | Kocinec et al. ............. 442/286 |

FOREIGN PATENT DOCUMENTS

| CA |   861467 CA | 1/1971 |
| CA |   935371 CA | 10/1973 |
| EP |   0 238 014 | 9/1987 |
| EP |   1 344 875 | 9/2003 |

OTHER PUBLICATIONS

Bakelite, "The Dawning of Air Barrier Technology", pp. 1 to 11.

Tyvek by DuPont, "Why Use a Breathable Membrane?", pp. 1 to 10.

National Research Council Canada, Division of Building Research,, "The Difference Between a Vapour Barrier and an Air Barrier" by R.L. Quirouette, BPN 54, Jul. 1985, ISSN 0701–5216, pp. 1 to 13.

* cited by examiner

*Primary Examiner*—Robert Canfield
(74) *Attorney, Agent, or Firm*—Bachman & LaPointe, P.C.

(57) ABSTRACT

A self-adhering air and moisture barrier sheet membrane for structural surfaces of buildings, which is permeable to the passage of water vapor, is comprised of a water vapor permeable sheet onto one surface of which is applied an adhesive in a non-continuous film.

24 Claims, 1 Drawing Sheet

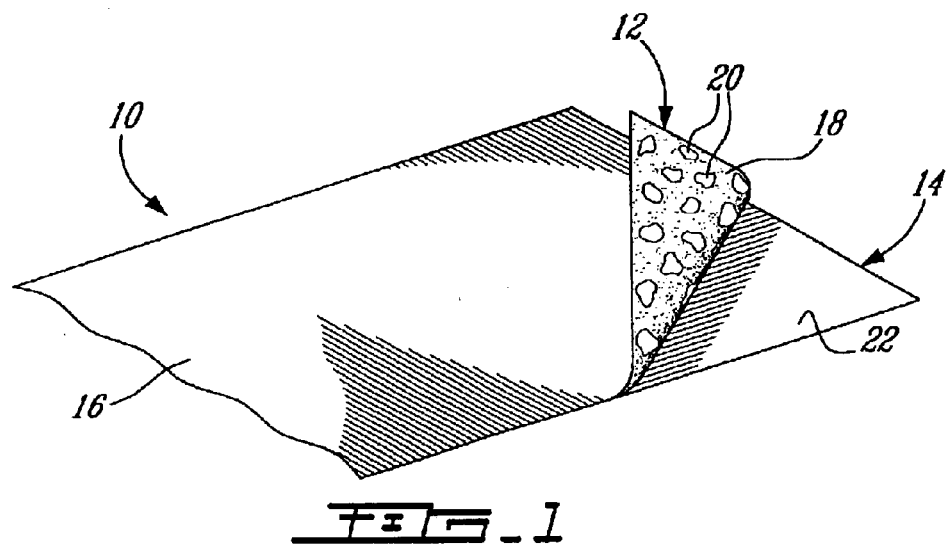
FIG_1
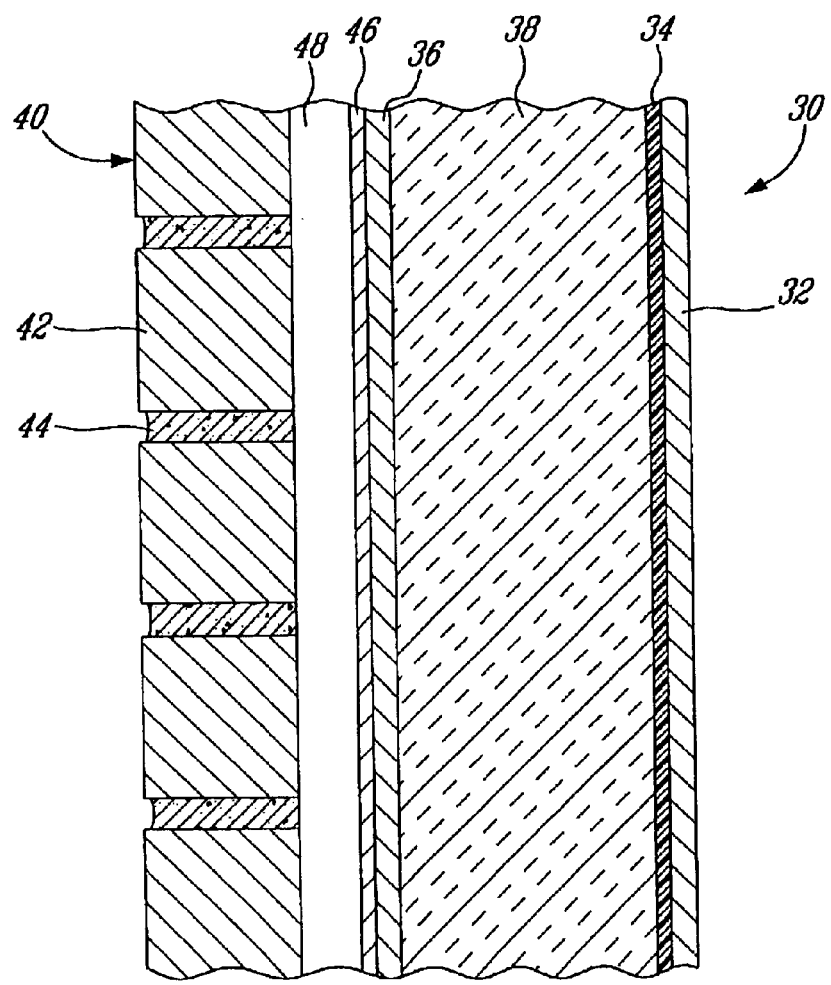
FIG_2

SELF-ADHERING VAPOR PERMEABLE AIR AND MOISTURE BARRIER MEMBRANE

BACKGROUND OF THE INVENTION i) Field of the Invention

This invention relates to a preformed sheet membrane, which can be used in the construction of buildings to control the movement of air and water through the building envelope. The invention also relates to an assembly comprising a wall structure which incorporates the membrane, and a method of assembling such a wall structure.

ii) Description of Prior Art

Moisture problems in walls have been attributed to two principal mechanisms: water vapor diffusion and air leakage. In recent years, control of air movement has become recognized as a major factor determining building performance, as measured by how well a building functions during its lifespan. Depending on local climate, air leakage through walls can result in excessive efflorescence, spalling of masonry, frozen pipes, condensation and ice buildup in cavities, wet and dysfunctional insulation, mold growth as well as rain penetration, high energy costs and poor control of the building environment.

Air leakage is the uncontrolled movement of air through the building envelope. This movement of air into a building (infiltration) and out of a building (exfiltration) is caused by pressure differences produced by wind, stack or chimney effect and fan pressurization. Air leakage may follow such paths as holes or openings through the envelope, for example, cracks or joints between infill components and structural elements or through porous materials such as concrete block and porous insulation materials.

Older methods of building design often relied solely on the use of vapor barriers or retarders, such as polyethylene film, to control water vapor movement in the building envelope. The vapor barrier retards the diffusion of water through the assembly of materials in a wall. The rate at which water vapor migrates or diffuses through a material depends on two factors: the difference between the water vapor pressure in the air inside the building and that in the outside air, and the resistance that materials present to the migration of water by diffusion. A vapor barrier is a material that offers a higher resistance to the diffusion of water vapor than most other materials. Polyethylene film of sufficient thickness is the material most commonly used for this purpose; however, other materials such as aluminum foil, some paint products, some insulation mastic adhesives and some mastic coatings have been used as vapor barriers. The moisture diffusion control property of a material is its water vapor permeance. This is usually expressed as the weight of moisture that will diffuse through a given area over a specified period of time at a unit vapor pressure difference. According to Canadian Standard CAN/CGSB-51.34-M86, a polyethylene sheet vapor barrier must have a maximum water vapor permeance of 15 $ng/Pa \cdot s \cdot m^2$ when tested in accordance with ASTM E 96.

For the vapor barrier to control condensation resulting from vapor diffusion, it must be placed on or near the warm side of the insulation, which is normally the high vapor pressure side.

Water vapor diffusion is one of the mechanisms by which water can be transported into a wall or roof cavity. The provision of a vapor barrier within the wall or roof assembly satisfies only part of the requirement of controlling moisture entry into building enclosures. The other mechanism, which is now considered to be far more significant, is air leakage. Both mechanisms may, however, operate at the same time.

The principal function of the air barrier is to stop outside air from entering the building through the walls, windows or roof, and inside air from exfiltrating through the building envelope to the outside. This applies whether the air is humid or dry, since air leakage can result in problems other than the deposition of moisture in cavities. Exfiltrating air carries away heating and cooling energy, while incoming air may bring in pollution as well as disable a rain screen wall system.

Moisture-laden air passing through an insulated cavity with a vapor barrier may deposit much more moisture than would diffuse through the vapor barrier in the same period of time. Recent practices are increasingly recognizing the importance of incorporating an air barrier system in building designs.

Materials and the method of assembly chosen to build an air barrier system must meet several requirements if they are to perform the air leakage control function successfully.

1. There must be continuity throughout the building envelope. The air barrier material of the wall must be continuous with the air barrier material of the roof (e.g., the roofing membrane). The air barrier material of the wall must be connected to the air barrier material of the window frame, etc.
2. The air barrier system must be fastened to a supporting structure to resist a peak wind load, a sustained stack effect or pressurization from ventilation equipment; it must be sufficiently rigid to resist displacement.
3. The air barrier system must be virtually air-impermeable. According to the requirements of Part 5 of the 1995 National Building Code of Canada, the material in the air barrier system intended to provide the principal resistance to air leakage is required to have an air leakage characteristic not greater than 0.02 $L/s.m^2$ measured at a pressure differential of 75 Pa.
4. The air barrier assembly must be durable in the same sense that the building is durable, and be made of materials that are known to have a long service life or be positioned so that it may be serviced from time to time.

A wall or roof assembly will require an air barrier and possibly also a vapor barrier. They may or may not be the same material. But a combined system must meet the design requirements for both functions.

A vapor barrier is usually placed on the warm side of the insulation. It may also be positioned part way into the insulation but, for satisfactory performance, it should be no further in than the point at which the temperature of the inside air drops to its dew point. While it is preferable that the air barrier system be placed on the warm side of an insulated assembly, it is not an essential requirement as it is with the vapor barrier. The position of the air barrier in a wall or roof is more a matter of suitable construction practice and the type of materials to be used. However, if this barrier is positioned on the outside of the insulation, consideration must be given to its water vapor permeability in case it should also act as a barrier to vapor which is on its way out from inside the wall assembly. This situation may be prevented by choosing an air barrier material that is ten to twenty times or more permeable to water vapor diffusion than the vapor barrier material, in order to prevent high humidity conditions and the potential of mold development or condensation in the wall assembly. It is this situation that demonstrates the need for a water vapor permeable (or breathable) air barrier membrane.

According to Canadian Standard CAN 2-51.32-M77, a breather type sheathing membrane must have a water vapor permeance of no less than 170 ng/Pa·s·m$^2$ when tested in accordance with ASTM E 96.

In the current state of the art, there are products available both in preformed sheet form supplied in rolls and in liquid form to be applied by bush, spray or trowel that can serve as air and moisture barrier membrane materials. As examples of preformed sheet products, there may be mentioned Blueskin (trade-mark) SA Self-Adhesive Air & Vapor Barrier Membrane and Blueskin (trade-mark) TG Thermofusible Grade Air & Vapor Barrier Membrane as manufactured by Bakor Inc. These products are based on a polymer modified bitumen laminated to a polyethylene film surface and, in the case of the Blueskin TG, reinforced with a non-woven fiberglass. Canadian Patent 1,261,239 describes an air barrier membrane, consisting of a reinforcing sheet of organic fibers coated on both sides with a bitumen binder, which can be applied using a torch or which can be self-adhering and cold applied by pressure. Bituminous materials and polyethylene films are known to be excellent vapor barriers.

Materials similar to the above are also used as waterproofing membranes, which are normally installed on foundation walls below ground level, as opposed to the air and moisture barriers discussed herein, which are normally installed on exterior walls above ground, and roofs, to protect against the infiltration and exfiltration of air and the infiltration of wind driven rain. Some such materials are described in Canadian Patents 861,467 and 935,371.

As examples of liquid applied air and moisture barrier products, there may be mentioned Air-Bloc 06 (trade-mark) Elastomeric Liquid Air & Vapor Barrier and Air-Bloc 31 (trade-mark) Liquid Emulsion Vapor Permeable Air Barrier Membrane, as manufactured by Bakor Inc. Although the technology exists for a vapor permeable air and moisture barrier membrane of the liquid applied type, there does not currently exist a preformed sheet membrane which entirely meets the practical requirements for providing an air and moisture barrier system as previously outlined. Liquid applied membranes themselves need to have preformed sheets incorporated into the air and moisture barrier system to tie the liquid applied membrane into beams, window and door frames and to connect the roof membrane in order to provide continuity of the system. Sheet membranes are often preferred over liquid applied membranes because sheet membranes come with factory-controlled thickness.

Some preformed sheet membrane products offer a partial solution to providing a water vapor permeable or breathable air barrier system. One such product is Tyvek⁻ (trade-mark) spunbonded polyolefin sheet as manufactured and sold by DuPont under U.S. Pat. No. 3,532,589. This type of product presents a number of difficulties in achieving an air barrier system in that multiple accessory products are required in order to create a continuous plane of air tightness throughout the building envelope. These accessories include mechanical fasteners, nails or screws, with large diameter metal or plastic plates or washers to secure the membrane, seaming tape to tape the joints of the membrane and flexible flashing for all transition areas such as tie-ins to window frames. The use of a tape, and multiple mechanical fasteners which puncture the membrane compromise the integrity of the system.

In addition, further difficulties occur when attempting to mechanically fasten this type of product on commercial buildings over such substrates as concrete block as opposed to wood frame housing. Further, because this type of membrane is not fully adhered to the substrate, it allows air to move freely behind it, to find an opening or defect in the membrane through which it can escape.

A potential solution to the deficiencies exhibited by current breathable sheet materials would appear to be in the use of an adhesive, applied to one side of the sheet, to enable the sheet to be self-adhered to the substrates, thus eliminating the need for mechanical fasteners and tapes. However, adhesive films as normally applied tend to substantially reduce the water vapor permeance of the sheets.

SUMMARY OF THE INVENTION

It is an object of the invention to provide a preformed sheet air barrier membrane which is permeable to water vapor and which can be adhered to a substrate, substantially over its entire area, by virtue of an adhesive deposited on one side of the sheet.

A further object of the invention is to provide a pattern for depositing the adhesive on the membrane such that the lateral movement of air between the membrane and the substrate or through lap joints of membrane sections is restricted.

A still further object of the invention is to provide a water vapor permeable, air barrier sheet membrane which can be installed without the use of mechanical fasteners, nails, screws or tapes to provide an air barrier system with a continuous plane of air tightness.

Another object of this invention is to provide an adhesive backed water vapor permeable sheet membrane that can perform as a barrier to the infiltration of liquid or bulk water as from wind driven rain, when used in wall and roof assemblies.

In accordance with one aspect of this invention, there is provided a membrane permeable to water vapor, on one side of which is deposited an adhesive in a non-continuous film leaving zones of uncoated membrane, thereby permitting the diffusion of water vapor through the membrane at the uncoated zones.

In accordance with another aspect of this invention, the adhesive is deposited in a pattern on the membrane such that the adhesive intersects or connects in a manner to avoid providing channels through which air can laterally migrate when the membrane is bonded to a substrate or overlapped to provide a lap joint.

In accordance with yet another aspect of the invention, the membrane, although permeable to water vapor, is impermeable to liquid or bulk water and can thus perform as an adhesive backed moisture barrier which is permeable to water vapor.

In accordance with a further aspect of the invention, there is provided a self-adhering, water vapor permeable, air and moisture barrier sheet for structural surfaces of buildings, comprising (i) an air and moisture barrier membrane which is water vapor permeable, and (ii) has an adhesive applied to one side of the water vapor permeable membrane in a non-continuous film.

In accordance with a particular embodiment of the invention, there is provided a self-adhering sheet for structural surfaces, comprising, (a) an air and moisture barrier membrane having opposed first and second faces, said membrane being water vapor permeable, and (b) an adhesive applied to said second face in a non-continuous film to define a plurality of spaced apart non-adhesive coated zones surrounded by an adhesive coated zone.

In yet another aspect of the invention, there is provided an article of manufacture comprising a self-adhering sheet of the invention having a strippable release sheet removably adhered to said second face by said non-continuous adhesive film.

In still another aspect of the invention, there is provided an assembly comprising a hollow wall structure having an external wall member and an opposed internal wall member, a vapor impermeable barrier sheet disposed within said structure adjacent said internal wall member, and a self-adhesive sheet, of the invention, spaced from said barrier sheet and disposed between said barrier sheet and said external wall member.

In still another aspect of the invention, there is provided a method of assembling a wall structure comprising, in any sequence, providing an internal wall member, disposing a vapor impermeable barrier sheet adjacent an exterior face of said internal wall member, disposing a self-adhering sheet, of the invention, externally of said barrier sheet and spaced apart therefrom, and disposing an external wall member externally of said self-adhering sheet and spaced therefrom.

DESCRIPTION OF THE PREFERRED EMBODIMENTS i) Vapor Permeable Membrane

The vapor permeable membrane of the invention is a flexible sheet or film normally supplied in roll form, which is permeable to the passage of water in vapor form. The sheet or film may be microporous, microperforated or some other type of vapor permeable sheet or film.

A microporous sheet or film is a non-perforated continuous microfibre web with microscopic pores large enough for moisture vapor to pass through, but small enough to resist air and liquid water. Microperforated membranes depend on mechanical pin-perforations and/or film laminations to build in properties.

While both of the abovementioned types of sheet or film are permeable to water vapor, a sheet or film of the microporous type is preferred as this type is less permeable to the passage of water or moisture in liquid or bulk form.

Suitable microporous sheets or films are spunbonded or fibrous bonded polyolefin as described in U.S. Pat. Nos. 3,532,589 and 5,972,147, preferred polyolefins are polyethylene and polypropylene, one such microporous sheet is available commercially under the trade-mark Tyvek; other suitable microporous sheets include oriented polymeric films as described in U.S. Pat. No. 5,317,035, and which comprise ethylene-propylene block copolymers; one such film is commercially available as Aptra (trade-mark)⁻. The sheets or films may be reinforced with various types of scrim materials or may be laminated to other vapor permeable sheets or films, such as non-woven polypropylene or non-woven polyester for the purpose of improving strength and other physical properties.

In general, the membrane will typically have a thickness of 0.001 to 0.04, preferably 0.001 to 0.025 inches.

ii) Adhesive

The adhesive can be a hot melt adhesive, solvent based adhesive, water based adhesive or of other types such as UV cured polymer. The applied adhesive is preferably tacky, i.e. -sticky and pressure sensitive. Suitable hot melt adhesives may contain such ingredients as polymers such as butyl rubber, styrene-butadiene-styrene (SBS), styrene-isoprene-styrene (SIS), styrene butadiene (SB), styrene-ethylene-butadiene-styrene (SEBS) and ethylenevinylacetate (EVA); resins such as those of the hydrocarbon and rosin types, natural and petroleum waxes, oils, bitumen and others. Solvent-based adhesives may contain ingredients such as those listed above, dissolved or dispersed in a solvent vehicle. Water based adhesives would normally be based on emulsions of polymeric materials. Suitable polymeric materials would include vinyl acetate and acrylic polymers and copolymers such as vinyl acetate acrylic, ethylene vinyl acetate as well as styrene acrylic, vinyl chloride acrylic, vinyl versatate and others.

From a production standpoint, the preferred adhesives are of the hot melt type which are simply melted for application and need not emit solvent which is an environmental pollutant and may require re-condensation. Water based adhesives have the disadvantage that they generally require the additional use of drying ovens or heat lamps to evaporate the water.

The adhesive may suitably be applied at a thickness of 0.001 inches to 0.1 inch, but is preferably applied at a thickness of 0.003 inches to 0.025 inches and most preferably at a thickness of 0.005 inches to 0.02 inches.

The adhesive may be protected with a strippable release sheet or liner to enable packaging in rolls. Suitable release sheets are paper sheet, having a silicone release surface coating and some treated plastic films.

iii) Adhesive Pattern

To retain an essential level of water vapor permeance in the adhesive coated membrane, the adhesive is applied to the vapor permeable membrane in a non-continuous film in order to leave parts, or spots or zones of the sheet uncoated with adhesive.

In order to prevent the lateral movement of air between the membrane and the substrate to which it is bonded, and through lap joints of the membrane, the adhesive coated areas of the membrane can be made to intersect to isolate the uncoated areas, thereby eliminating channels through which air can laterally move. This can be achieved by any number of patterns, such as intersecting circles with adhesive free centers, intersecting squares or rectangles of adhesive, intersecting strips in a checkered pattern, etc.

In general, the adhesive film forms an adhesive sea on the membrane surface, with a multitude of membrane islands, surrounded by but not covered by the adhesive sea.

The adhesive may suitably be applied so as to cover 5% to 99% of the area of one side of the membrane, but is preferably applied to cover between 25% and 90% of the area, and most preferably between 50% and 80% of the area, to obtain the optimum balance of adhesion and vapor permeance in the sheet.

iv) Primer

As is common with other types of self-adhering membranes, the use of a liquid primer coating may sometimes be recommended to improve adhesion of the membrane to some substrates. In the case of a vapor permeable membrane, the primer should be selected from certain materials or applied at a reduced rate or in a manner such that the breathability of the assembly is not compromised.

v) Vapor Impermeable Barrier Sheet

The vapor permeable membrane sheet of the invention is typically employed in a building structure, especially a wall structure, in conjunction with a vapor impermeable barrier sheet. A preferred sheet is a polyethylene sheet, as known in the art, having a water vapor permeance of not more than 15 ng/Pa·s·m² (ASTM E 96).

Such a sheet may be considered a vapor retarder, since it is not completely impermeable to water vapor.

Typically, the barrier sheet has a thickness of 0.001 to 0.008 inches, more usually 0.002 to 0.006 inches.

BRIEF DESCRIPTION OF DRAWINGS

FIG. 1 is a schematic view of a membrane assembly of the invention; and

FIG. 2 is a schematic cross-section of a wall structure assembly of the invention.

DESCRIPTION OF PREFERRED EMBODIMENTS WITH REFERENCE TO THE DRAWINGS

With further reference to FIG. 1, a membrane assembly 10 includes a self-adhering sheet 12 and a release liner 14.

Sheet 12 comprises a vapor permeable membrane 16, having on one side a non-continuous adhesive film. Membrane 16 is impermeable to air and water and thus provides a barrier to air and water.

A plurality of zones 20 of membrane 16 are defined by the film 18. Essentially, the zones 20 form islands of uncoated membrane in the sea of adhesive film 18.

Sheet 12 adheres to release liner 14 by means of adhesive film 18.

Release liner 14 has a release surface, for example, a silicone surface 22, which permits ready separation of sheet 12 and liner 14 to expose adhesive film 18, for adhesion to a substrate in use.

With further reference to FIG. 2, a wall structure assembly 30 includes an interior gypsum wall panel 32 and an exterior wall structure 40.

A vapor impermeable barrier sheet 34, for example of polyethylene, is mounted adjacent interior gypsum wall panel 32.

A second or exterior gypsum wall panel 36 is disposed in spaced relationship with interior gypsum wall panel 32, between panel 32 and the external wall structure 40.

Insulation 38 is disposed between gypsum wall panel 36 and barrier sheet 34.

A self-adhering sheet 46, which will typically be of the form of sheet 12 of FIG. 1, is adhered to gypsum wall panel 36.

External wall structure 40 may, for example, comprise bricks 42 and mortar 44.

Typically, the wall structure assembly 30 may include an air cavity 48 between external wall structure 40 and sheet 46, and optionally, there may be further insulation (not shown) in this cavity.

It will be understood that the sheet 46 or 12 adheres to the gypsum wall panel 36 by means of the adhesive film 18.

EXAMPLE

The invention is further illustrated by the example and comparative tests below.

A self-adhering sheet membrane was constructed by applying a hot melt pressure sensitive adhesive to a membrane comprising Pro/Shield (trade-mark) 2, a product of Kappler Protective Apparel & Fabrics. Pro/Shield is a composite membrane in which one ply of light non-woven polypropylene mat is laminated by heat and pressure to one ply of a microporous film available under the trade-mark APTRA, a product of Amoco Fabrics & Fibers Company. The typical properties of Aptra microporous film are given in Table 1 while those of Pro/Shield 2 are given in Table 2.

The adhesive was applied using a coater, and was applied to the non-woven polypropylene side of the composite membrane at a rate of 3 oz. per square yard, at a thickness of 0.01 inches, covering approximately 75% of the surface area of the membrane. The adhesive pattern was such that circular shaped adhesive-free spots or zones of approximately 0.05 inches in diameter were surrounded by the adhesive matrix. The adhesive layer was protected by covering with a sheet of removable siliconized release paper. The product was produced in rolls of approximately 60 inches wide by 100 feet in length, which could be further slit into more convenient widths for various applications.

Water vapor permeance tests were conducted in accordance with ASTM E 96, on the above self-adhering sheet (A) and on a similarly prepared sample of sheet (B) on which the hot melt adhesive was applied in an even, continuous film at the same rate of 3 oz. per square yard. The following results were obtained:

| | |
|---|---|
| Sheet A | 2370 ng/Pa · m$^2$ · s |
| Sheet B | 55 ng/Pa · m$^2$ · s |

These results show that Sheet A, which had a non-continuous adhesive film, exhibited a water vapor permeance greater than 170 ng/Pa·s·m$^2$, thus meeting the requirements of Canadian Standard CAN2-51.32-M77 for a breather type membrane, while Sheet B with a continuous film of adhesive applied at the same rate, exhibited a significantly lower water vapor permeance and did not meet the standard.

Sheet A was tested for air leakage in accordance with Bodycote Materials Testing Procedure #93-J53-SP-013A. The sheet was applied by hand pressure to the prepared surface of a 1220 mm by 1220 mm by 152 mm thick concrete block wall, incorporating a lap joint averaging 188 mm down the center. The air leakage test was carried out in accordance with ASTM E 283-91 (1999) "Standard Test Method for Determining the Rate of Air Leakage Through Exterior Windows, Curtain Walls and Doors Under Specified Pressure Differences Across the Specimen". The air leakage rate at a negative pressure differential of 75 Pa was determined to be 0.010 L/s·m$^2$. This value is in compliance with the 1995 National Building Code of Canada requirement of 0.02 L/s·m$^2$ maximum.

TABLE I

APTRA ™ FILM TYPICAL PROPERTIES

| | UNITS | | |
|---|---|---|---|
| PROPERTY | English | SI | Test Methods |
| Basis Weight | 0.75 oz/yd$^2$ | 25 g/m$^2$ | ASTM D-751 |
| Thickness | 1.5 mils | 38μ | ASTM D-751 |
| Grab Tensile Strength | | | |
| MD | 13 lbs | 59 N | ASTM D-751 |
| TD | 12 lbs | 53 N | |
| Grab Elongation | | | |
| MD | | 100% | ASTM D-751 |
| TD | | 70% | |
| 1" Strip Tensile Strength | | | |
| MD | 4.0 lbs | 18 N | ASTM D-751 |
| TD | 3.5 lbs | 16 N | |
| 1" Strip Elongation | | | |
| MD | | 120% | ASTM D-751 |
| TD | | 75% | |
| Mullen Burst Strength | 68 psi | 470 kPa | ASTM D-751 |
| CPAI Hydrostatic Resistance | >50 in | >12.5 kPa | ASTM D-751 |
| Gurley Densometer Porosity | | 900 s/100 cc | AFFC PT-076 |
| Water Vapor Transmission Rate | | 5000 g/m$^2$/24 h | ASTM E-96, method E |

TABLE 2

Pro/Shield ® 2 TYPICAL PROPERTIES

| Physical Property | Test Method | Results Imperial | Results Metric |
|---|---|---|---|
| Basis Weight | ASTM D751 | 1.7 oz/yd$^2$ | 57.6 g/m$^2$ |
| Grab Tensile Strength | ASTM D751 | MD 30 lbs | MD 133 N |
| | | CD 26 lbs | CD 115 M |
| Puncture/Propagation Tear | ASTM D2582 | MD 6.4 lbs | MD 28.4 N |
| | | CD 9.3 lbs | CD 41.3 N |
| Ball Burst | ASTM D3787 | 26 lbs. | 115 N |
| Hydrostatic Water Resistance | ASTM D751 PROCEDURE A | 17.7 psi | 122.0 kPa |
| Moisture Vapor Transmission Rate (g/m$^2$/24 hrs) | ASTM E-96 PROCEDURE D | 1481.5 | 1481.5 |
| Surface Resistivity (ohm/cm) | ASTM D257 | <10$^{11}$ | <10$^{11}$ |

What is claimed is:

1. A self-adhering, water vapor permeable, air and moisture barrier sheet for structural surfaces of buildings, comprising
    i) an air and moisture barrier membrane which is water vapor permeable, and
    ii) an adhesive applied to one side of the water vapor permeable membrane in a non-continuous film.

2. A sheet according to claim 1, wherein the membrane vapor is a microporous film or a composite thereof.

3. A sheet according to claim 2, wherein the microporous film is an oriented polymeric film or a composite thereof.

4. A sheet according to claim 2, wherein the microporous film is a polyolefin film or a composite thereof.

5. A sheet according to claim 2, wherein the microporous film is a polypropylene film or a composite thereof.

6. A sheet according to claim 2, wherein the microporous film is a spun bonded polyolefin or a composite thereof.

7. A sheet according to claim 1, wherein the adhesive is a hot melt adhesive.

8. A sheet according to claim 7, wherein the adhesive is applied at a thickness of 0.001 inches to 0.1 inches.

9. A sheet according to claim 8, wherein said thickness is 0.003 inches to 0.025 inches.

10. A sheet according to claim 8, wherein said thickness is 0.005 inches to 0.02 inches.

11. A sheet according to claim 8, wherein the adhesive is applied to cover 5% to 99% of the area of said one side of the membrane.

12. A sheet according to claim 9, wherein the adhesive is applied to cover 25% to 90% of the area of said one side of the membrane.

13. A sheet assembly according to claim 10, wherein the adhesive is applied to cover 50% to 80% of the area of said one side of the membrane.

14. A sheet according to claim 1, wherein the adhesive is applied to the sheet in a non-continuous film such that adhesive coated areas intersect to isolate the uncoated areas of the membrane.

15. A self-adhering sheet for structural surfaces, comprising,
    a) an air and moisture barrier membrane having opposed first and second faces, said membrane being water vapor permeable, and
    b) an adhesive applied to said second face in a non-continuous film to define a plurality of spaced apart non-adhesive coated zones surrounded by an adhesive coated zone.

16. A sheet according to claim 15, wherein said non-adhesive coated zones are disposed to inhibit lateral migration of air across said second face, when said second face is bonded by said non-continuous adhesive film to a substrate.

17. A sheet according to claim 16, wherein said film has a thickness of 0.005 to 0.02 inches, and said adhesive coated zone covers 50 to 80% of the area of said second face.

18. A sheet according to claim 15, wherein said adhesive is a water vapor impermeable hot melt adhesive.

19. An article of manufacture comprising a sheet of claim 15 having a strippable release sheet removably adhered to said second face by said non-continuous adhesive film.

20. An assembly comprising:
    a hollow wall structure having an external wall member and an opposed internal wall member,
    a vapor impermeable barrier sheet disposed within said structure adjacent said internal wall member, and
    a self-adhesive sheet of claim 1 spaced from said barrier sheet and disposed between said barrier sheet and said external wall member.

21. An assembly according to claim 20, further including insulation material disposed in said structure between said barrier sheet and said self-adhesive sheet.

22. An assembly according to claim 21, further including insulation material disposed in said structure between said self-adhering sheet and said external wall member.

23. An assembly according to claim 20, wherein said barrier sheet is a polyethylene sheet having a water vapor permeance of not more than 15 ng/Pa·s·m$^2$ in accordance with ASTM E96, and said self-adhering sheet has an air permeance of not more than 0.02 L/s.m$^2$ at a pressure differential of 75 Pa.

24. A method of assembling a wall structure comprising, in any sequence:
    providing an internal wall member,
    disposing a vapor impermeable barrier sheet adjacent an exterior face of said internal wall member,
    disposing a self-adhering sheet of claim 1 externally of said barrier sheet and spaced apart therefrom, and
    disposing an external wall member externally of said self-adhering sheet and spaced therefrom.

* * * * *

UNITED STATES PATENT AND TRADEMARK OFFICE
CERTIFICATE OF CORRECTION

PATENT NO.   : 6,901,712 B2
DATED         : June 7, 2005
INVENTOR(S)  : Lionel Borenstein It is certified that error appears in the above-identified patent and that said Letters Patent is hereby corrected as shown below:

Title page,
Item [75], Inventor, "Borenstein Lionel" should read -- Lionel Borenstein --.

Column 9,
Line 27, "vapor" should be deleted.

Signed and Sealed this

Seventeenth Day of January, 2006

JON W. DUDAS
*Director of the United States Patent and Trademark Office*

(12) EX PARTE REEXAMINATION CERTIFICATE (9462nd)
United States Patent
Borenstein

(10) Number: US 6,901,712 C1
(45) Certificate Issued: Jan. 2, 2013

(54) SELF-ADHERING VAPOR PERMEABLE AIR AND MOISTURE BARRIER MEMBRANE

(75) Inventor: Lionel Borenstein, Laval (CA)

(73) Assignee: Henry Company Canada, Inc., Mississauga, Ontario (CA)

Reexamination Request:
No. 90/011,092, Jul. 28, 2010

Reexamination Certificate for:
Patent No.: 6,901,712
Issued: Jun. 7, 2005
Appl. No.: 10/402,440
Filed: Mar. 28, 2003

Certificate of Correction issued Jan. 17, 2006.

(30) Foreign Application Priority Data

Dec. 3, 2002 (CA) .................................... 2413550

(51) Int. Cl.
*B32B 13/04* (2006.01)
*B32B 13/00* (2006.01)
*B32B 7/02* (2006.01)
*B32B 7/14* (2006.01)
*C09J 7/07* (2006.01)

(52) U.S. Cl. .......... 52/408; 156/71; 52/741.1; 428/40.1; 428/41.8; 428/202; 428/220

(58) Field of Classification Search ........................ None
See application file for complete search history.

(56) References Cited

To view the complete listing of prior art documents cited during the proceeding for Reexamination Control Number 90/011,092, please refer to the USPTO's public Patent Application Information Retrieval (PAIR) system under the Display References tab.

*Primary Examiner* — Robert M. Fetsuga

(57) ABSTRACT

A self-adhering air and moisture barrier sheet membrane for structural surfaces of buildings, which is permeable to the passage of water vapor, is comprised of a water vapor permeable sheet onto one surface of which is applied an adhesive in a non-continuous film.

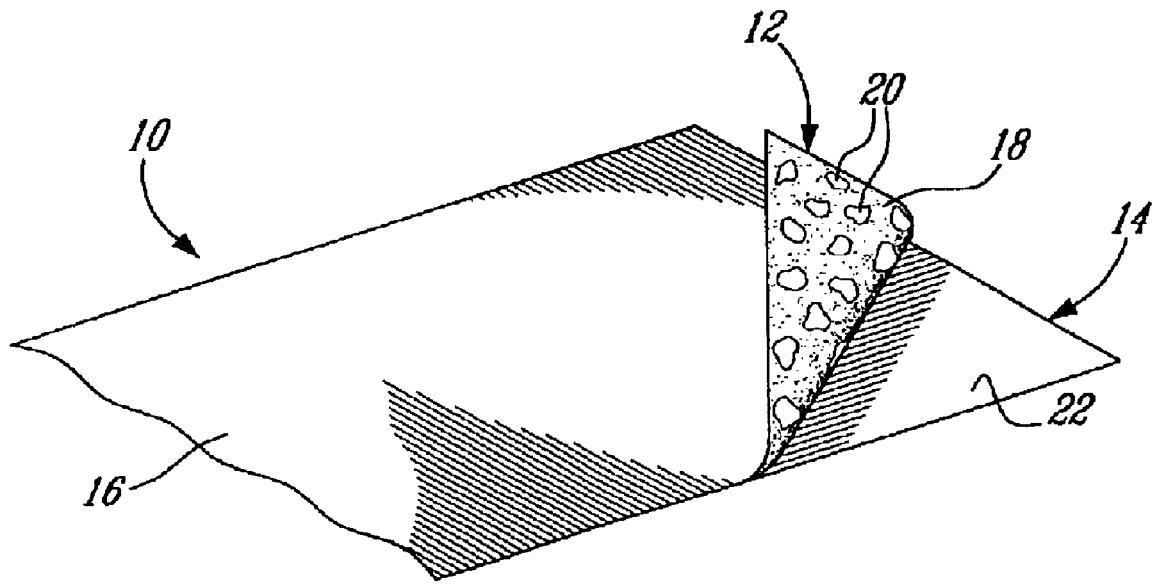

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 11 and 14-24 are cancelled.

Claims 2 and 8 are determined to be patentable as amended.

Claims 3-6, 9, 10, 12 and 13, dependent on an amended claim, are determined to be patentable.

New claim 25 is added and determined to be patentable.

2. A sheet according to claim [1] *8*, wherein the membrane is a microporous film or a composite thereof.

8. [A sheet according to claim 7,] *A self-adhering, water vapor permeable, air and moisture barrier sheet configured in a sheet form that can be applied to a building wall structure to form a building envelope on the building wall structure so as to control the movement of air and water through the building envelope, comprising*

*i) an air and moisture barrier membrane which is water vapor permeable, wherein the membrane is a polymeric film, and*

*ii) an adhesive applied to one side of the water vapor permeable membrane in a non-continuous film, wherein the adhesive is applied to cover 5% to 99% of the area of said one side of the membrane, and the adhesive has uncoated zones disposed to inhibit lateral migration of air across the side of the water vapor permeable membrane on which the adhesive is applied when the adhesive is applied to the building wall structure;*

*wherein the adhesive is a hot melt adhesive and wherein the adhesive is applied at a thickness of 0.001 inches to 0.1 inches.*

*25. A self-adhering, water vapor permeable, air and moisture barrier sheet configured in a sheet form that can be applied to a building wall structure to form a building envelope on the building wall structure so as to control the movement of air and water through the building envelope, comprising*

*i) an air and moisture barrier membrane which is water vapor permeable and a polymeric film, and*

*ii) an adhesive applied to one side of the water vapor permeable membrane in a non-continuous film, wherein the adhesive is a hot melt adhesive and the adhesive is applied at a thickness of 0.001 inches to 0.1 inches and has uncoated zones disposed to inhibit lateral migration of air across the side of the water vapor permeable membrane on which the adhesive is applied when the adhesive is applied to the building wall structure.*

\* \* \* \* \*